US012656733B2

(12) United States Patent
Nohara

(10) Patent No.: US 12,656,733 B2
(45) Date of Patent: Jun. 16, 2026

(54) IMAGE FORMING APPARATUS

(71) Applicant: KYOCERA Document Solutions Inc., Osaka (JP)

(72) Inventor: Yuta Nohara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 5 days.

(21) Appl. No.: 19/052,230

(22) Filed: Feb. 12, 2025

(65) Prior Publication Data

US 2025/0278057 A1 Sep. 4, 2025

(30) Foreign Application Priority Data

Feb. 29, 2024 (JP) ................................ 2024-029427

(51) Int. Cl.

*G03G 21/16* (2006.01)
*G03G 15/00* (2006.01)
*G03G 21/18* (2006.01)
*G03G 15/08* (2006.01)

(52) U.S. Cl.

CPC ....... *G03G 21/1853* (2013.01); *G03G 15/556* (2013.01); *G03G 15/0872* (2013.01); *G03G 2215/0665* (2013.01)

(58) Field of Classification Search

CPC ......................... G03G 15/556; G03G 21/1853
USPC ......................................... 399/107, 110, 111
See application file for complete search history.

(56) References Cited

U.S. PATENT DOCUMENTS

| | | | | |
|---|---|---|---|---|
| 10,545,430 | B2 * | 1/2020 | Nohara | G03G 15/0879 |
| 10,884,355 | B2 | 1/2021 | Nohara et al. | |
| 2019/0086832 | A1 | 3/2019 | Nohara et al. | |
| 2020/0117117 | A1 | 4/2020 | Nohara et al. | |

FOREIGN PATENT DOCUMENTS

| | | | |
|---|---|---|---|
| JP | 2019 056801 | A * | 4/2019 |
| JP | 2022022444 | A | 2/2022 |

* cited by examiner

*Primary Examiner* — Hoan H Tran
(74) *Attorney, Agent, or Firm* — Studebaker Brackett PLLC

(57) ABSTRACT

An image forming apparatus includes a plurality of container groups, and a housing part. Each container group includes a plurality of toner containers containing of toner of different colors. The housing part includes a side plate, a cover, a locking device, an upper stopper and a lower stopper. The side plate has opening rows formed for each container group in a plurality of levels in an upper-and-lower direction. The opening row includes a plurality of openings horizontally arranged. The cover is turned in an open posture for opening the opening and a close posture for closing the opening. The first stopper holds the cover at an opening angle of 90° or less to the side plate and a second stopper which holds the cover at an opening angle of larger than 90° when the cover is turned to the open posture.

9 Claims, 13 Drawing Sheets

IMAGE FORMING APPARATUS

INCORPORATION BY REFERENCE

This application is based on and claims the benefit of priority from Japanese patent application No. 2024-029427 filed on Feb. 29, 2024, which is incorporated by reference in its entirety.

BACKGROUND

The present disclosure relates to an image forming apparatus detachable toner container.

In the conventional electrophotographic image forming apparatus, one toner container is provided for each color, and toner is supplied from each toner container to a corresponding developing device. When the toner container becomes empty, the image forming apparatus is temporarily stopped to replace the toner container.

On the other hand, the image forming apparatus may include an upper container group and a lower container group each consisting of four toner containers in which toner of four colors (yellow, cyan, magenta, and black) are contained. The upper container group and the lower container group are housed in a toner housing part in an upper row and a lower row along the left-and-right direction. Thus, two toner containers are provided for each color. Since the toner can be supplied from the other toner container even when one toner container becomes empty, the stop time of the image forming apparatus can be shortened.

In the image forming apparatus described above, a height of the apparatus main body increases to some extent in order to house the upper and lower container groups. Therefore, it is required to make the height of the apparatus main body as low as possible. When the height of the apparatus main body is lowered in this manner, a distance between an upper cover and a lower cover is also shortened. Then, a turning range of the cover overlaps with a pull-out space of the toner container, and the toner container pulled out through an opening when replacing the toner container interferes with the opened cover. Further, since a number of the toner containers is increased, it is preferable that the cover can be easily opened and closed when replacing the toner container.

SUMMARY

An image forming apparatus according to the present disclosure includes a plurality of container groups, and a housing part. Each of the container groups includes a plurality of toner containers containing of toner of different colors. To and from the housing part to and from, the toner container is attached and detached. The housing part includes a side plate, a cover, a locking device, an upper stopper and a lower stopper. The side plate has opening rows formed for each container group in a plurality of levels in an upper-and-lower direction. The opening row includes a plurality of openings through which the toner containers are attached and detached and which are arranged horizontally. The cover is supported by a rotational shaft provided at a lower end portion of each opening of the side plate, and is turned in an open posture for opening the opening and a close posture for closing the opening. The locking device locks the cover turned in the close posture to the side plate. The first stopper holds the cover at an opening angle of 90° or less to the side plate and a second stopper which holds the cover at an opening angle of larger than 90° when the cover is turned to the open posture.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with the attached drawings, an image forming apparatus according to one embodiment of the present disclosure will be described.

Figure 1:
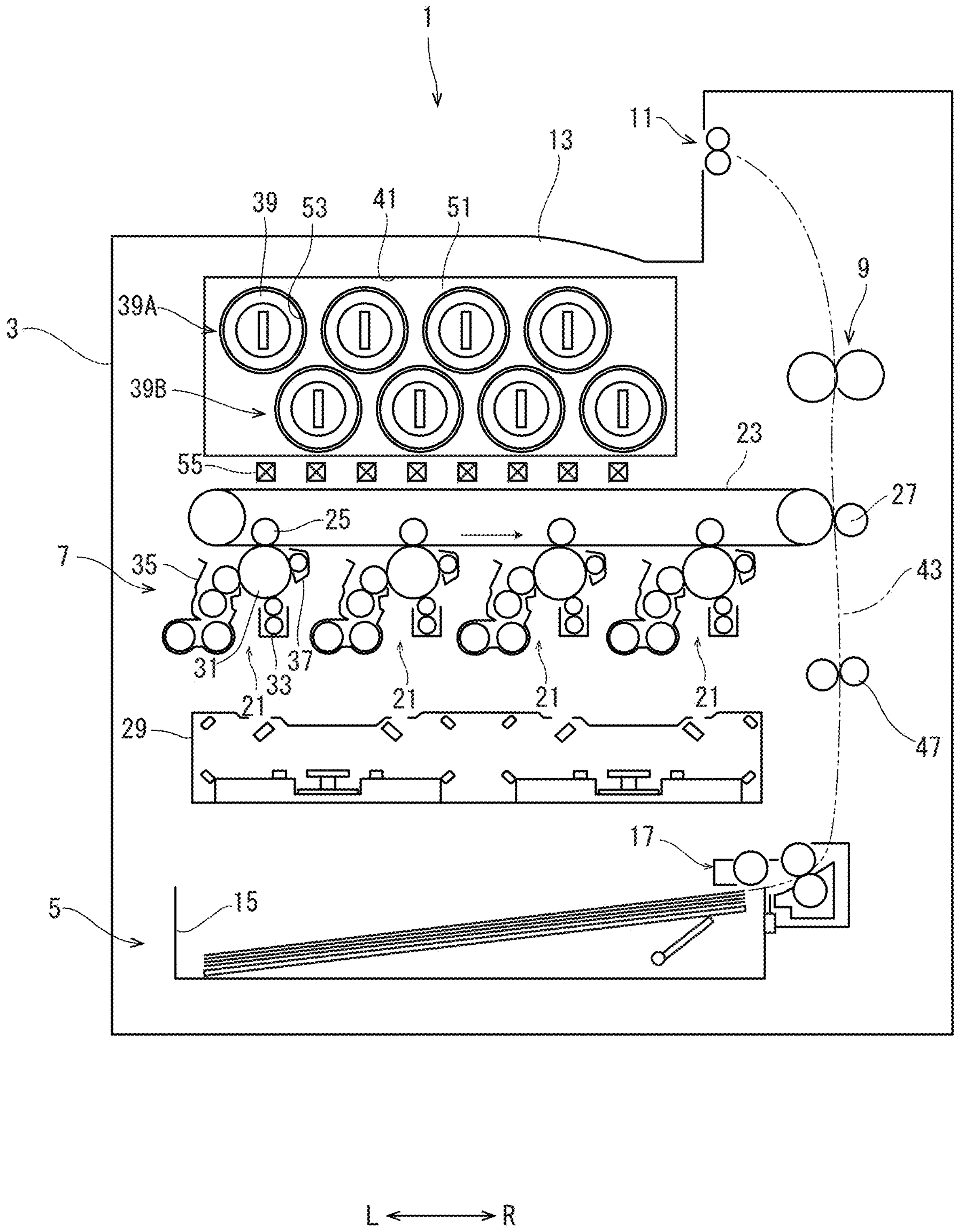
FIG. 1 is a front view schematically showing an internal structure of an image forming apparatus according to one embodiment of the present disclosure.

With reference to FIG. 1, an entire structure of the image forming apparatus 1 will be described. FIG. 1 is a front view schematically showing the internal structure of the image forming apparatus 1. Fr, Rr, L, and R in each of the figures indicate the front side, rear side, left side, and right side of the image forming apparatus 1, respectively.

The image forming apparatus 1 includes an apparatus main body 3 having a box-shaped housing structure. The apparatus main body 3 includes a sheet feeding part which feeds a sheet, an image forming part 7 which forms a toner image to be transferred to the sheet, a fixing part 9 which fixes the toner image to the sheet, and a discharging part 11 which discharges the sheet fixed with the toner image. A discharge tray 13 is provided on the upper surface of the apparatus main body 3.

The sheet feeding part 5 is disposed in the lower portion of the apparatus main body 3. The sheet feeding part 5 includes a sheet feeding cassette 15 in which the sheets are stored, and a sheet feeding device 17 which feeds the sheet stored in the sheet feeding cassette 15.

The image forming part 7 is disposed above the sheet feeding part 5. The image forming part 7 includes four image forming units 21 corresponding to toner of four colors (yellow, cyan, magenta, and black), an intermediate transfer belt 23, primary transfer rollers 25 corresponding to the four image forming units 21, a secondary transfer roller 27, and an exposure device 29. Each image forming unit 21 includes a rotatable photosensitive drum 31, and a charging device 33, a developing device 35, and a cleaning device 37 which are disposed around the photosensitive drum 31. The four image forming units 21 are arranged side by side in the left-and-right direction. Each developing device 35 is connected to a toner container 39 storing the toner of the corresponding color.

The toner containers 39 are housed in a container housing part 41 provided above the image forming part 7. The toner container 39 and the container housing part 41 will be described later.

The intermediate transfer belt 23 is disposed above the four image forming units 21, and wound between a driving roller and a driven roller which are disposed apart in the left-and-right direction, and travels in the direction indicated by the arrow in FIG. 1. The outer surface of the lower track of the intermediate transfer belt 23 faces the photosensitive drums 31 of the four image forming units 21, and a primary transfer nip is formed between the photosensitive drum 31 and the intermediate transfer belt 23. The four primary transfer rollers 25 are disposed in the hollow space of the intermediate transfer belt 23, and face the photosensitive drums 31 of the four image forming units 21 across the intermediate transfer belt 23. The secondary transfer roller 27 faces the driving roller across the intermediate transfer belt 23, and a secondary transfer nip is formed between the secondary transfer roller 27 and the intermediate transfer belt 23.

The fixing part 9 is disposed above the image forming part 7. The fixing part 9 includes a heating roller and a pressing roller, and a fixing nip is formed between both rollers. The discharging part 11 is disposed above the fixing part 9. The discharging part 11 includes a discharge rollers pair.

Further, a sheet conveyance path 43 is formed in the apparatus main body 3 from the sheet feeding device 17 of the sheet feeding part 5 to the discharge rollers pair of the discharging part 11 through the secondary transfer nip and the fixing nip. On the conveyance path 43, a registration rollers pair 47 is provided on the upstream side of the secondary transfer nip in the sheet conveyance direction.

The image forming operation will be briefly described. In each image forming unit 21 of the image forming part 7, the charging device 33 charges the photosensitive drum 31 to a predetermined potential. Thereafter, the photosensitive drum 31 is exposed by the exposure device 29 based on image data to form an electrostatic latent image. The electrostatic latent image is developed into a toner image by the developing device 35. At the primary transfer nip, the toner image is transferred from the photosensitive drum 31 to the intermediate transfer belt 23 by the primary transfer roller 25 to which the transfer bias is applied. In each of the four image forming units 21, the toner images are transferred to the intermediate transfer belt 23 to form a full-color toner image on the intermediate transfer belt 23.

On the other hand, in the sheet feeding part 5, the sheet is fed from the sheet feeding cassette 15 to the conveyance path 43 by the sheet feeding device 17. The sheet is conveyed along the conveyance path 43, and after the skew is corrected by the registration rollers pair 47, the sheet is conveyed to the secondary transfer nip. At the secondary transfer nip, the full-color toner image is transferred from the intermediate transfer belt 23 to the sheet by the secondary transfer roller 27 to which the transfer bias is applied. Thereafter, the sheet is conveyed to the fixing part 9, and the toner image is heated and pressurized at the fixing nip to be fixed to the sheet. The sheet is conveyed to the discharging part 11, and discharged to the discharge tray 13 by the discharge rollers pair.

Figure 2:
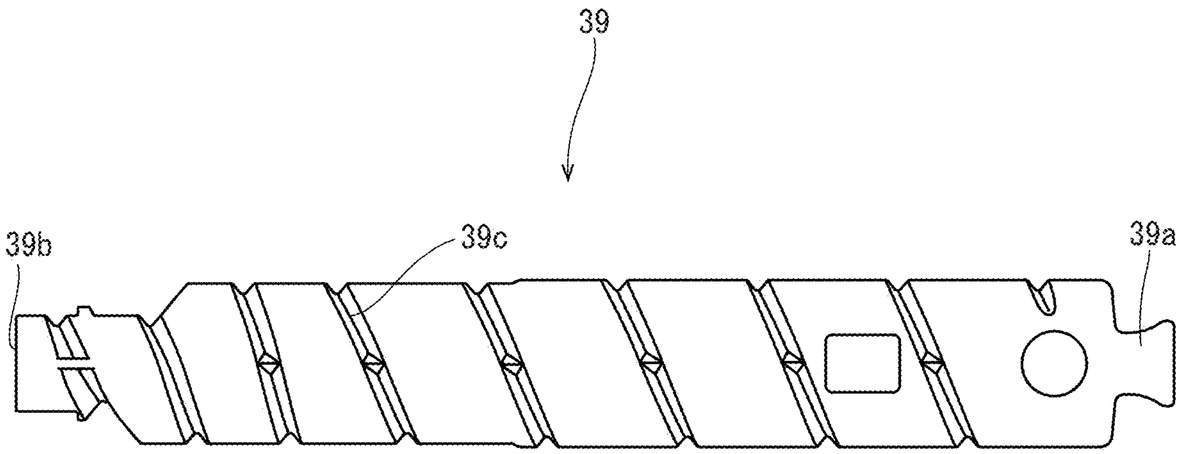
FIG. 2 is a side view showing a toner container in the image forming apparatus according to the embodiment of the present disclosure.

Next, the toner container 39 will be described with reference to FIG. 2. FIG. 2 is a side view showing the toner container 39. The toner container 39 is formed in a cylindrical shape having a hollow space for storing the toner. A small diameter projection 39*a* is provided on one end surface in the longitudinal direction of the toner container 39, and a discharge port 39*b* is provided on the other end surface in the longitudinal direction. On the inner circumferential surface of the toner container 39, a spiral protrusion 39*c* is formed along the longitudinal direction.

The toner containers 39 for storing the yellow, cyan and magenta toners have the same shape and the same capacity, and the toner container 39 for storing the black toner has a larger capacity than these toner containers 39. A memory chip (not shown) storing various kinds of information is stuck to each toner container 39.

Figure 3:
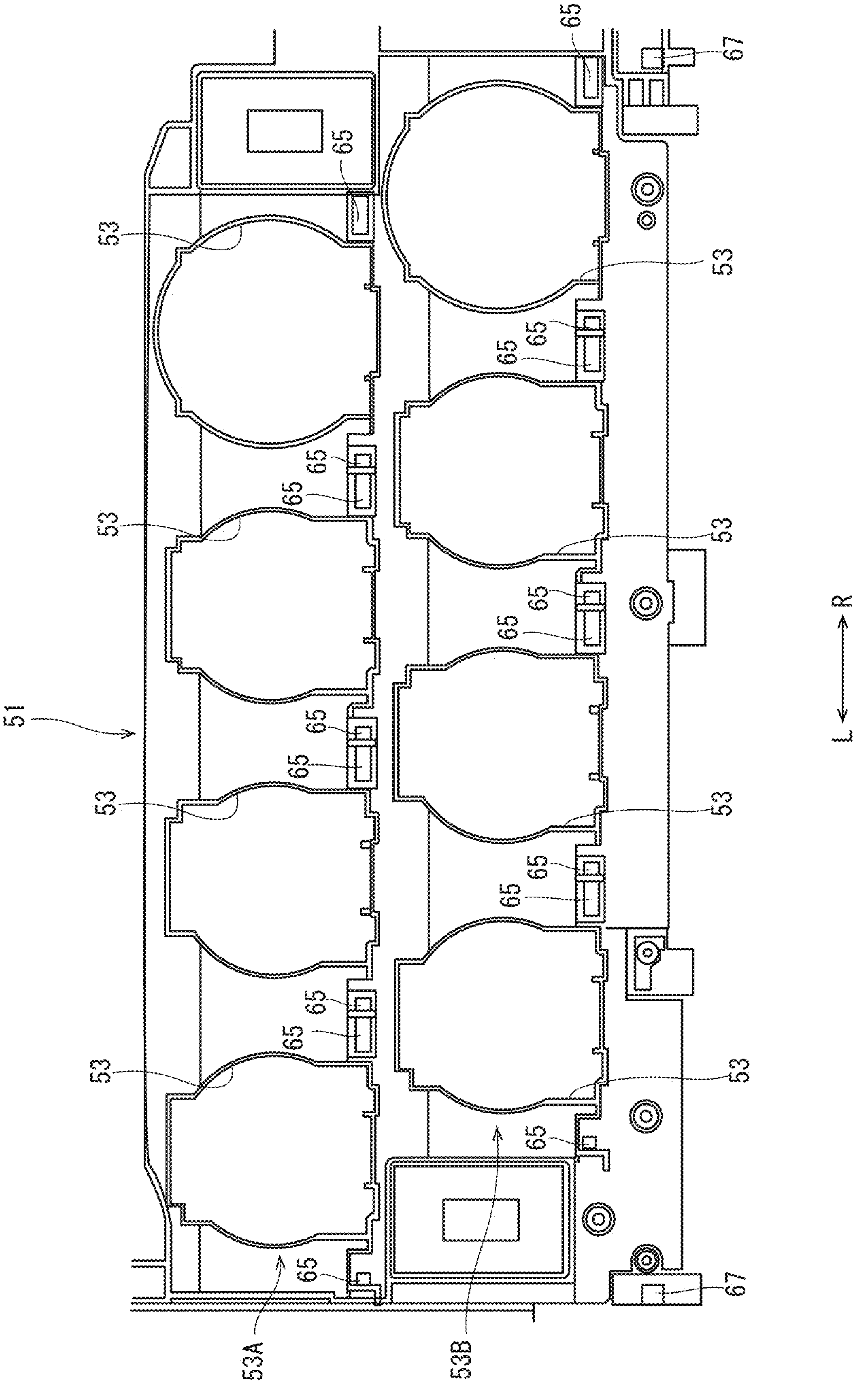
FIG. 3 is a front view showing a front side plate of the image forming apparatus according to the embodiment of the present disclosure.
Figure 4:
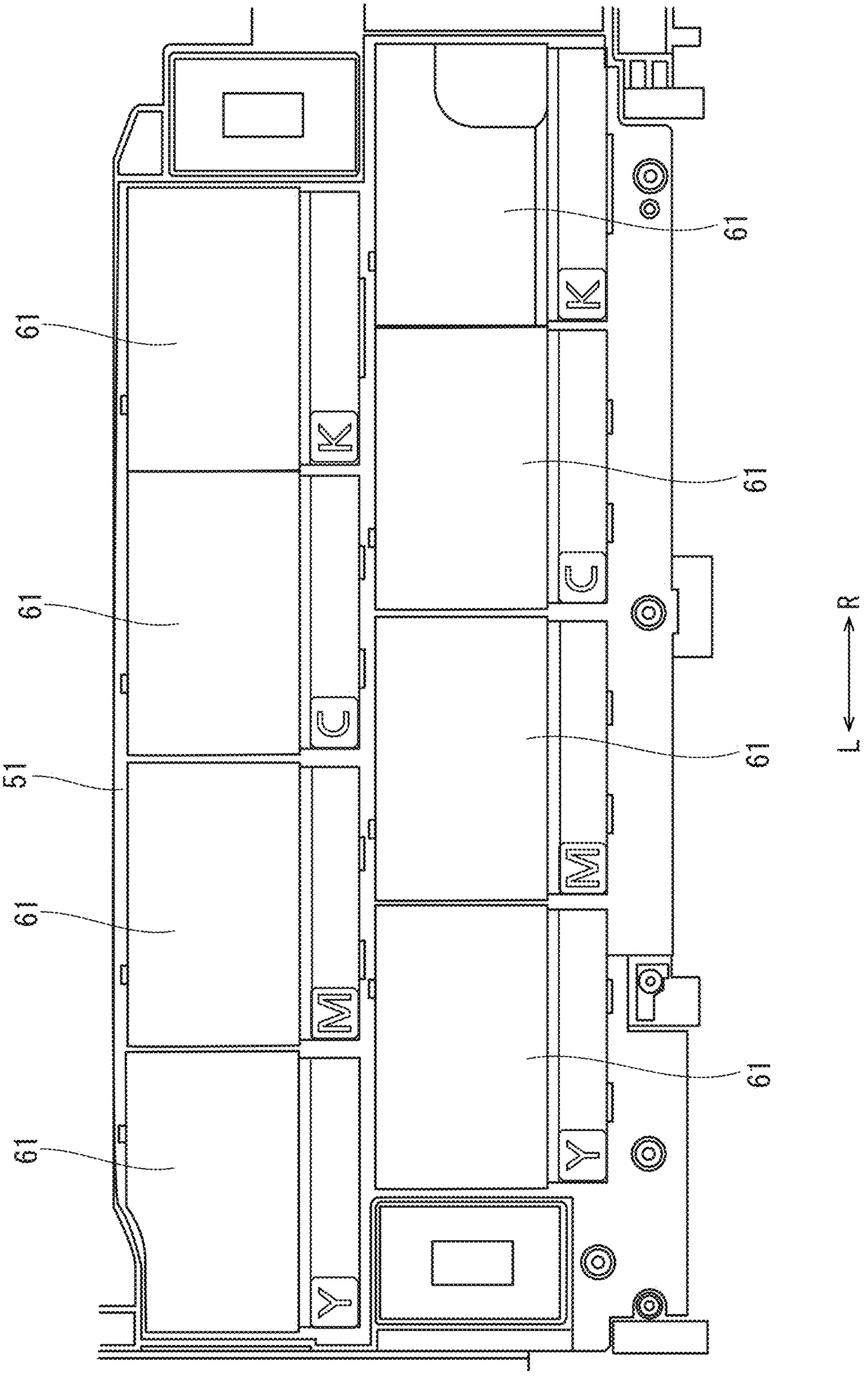
FIG. 4 is a front view showing an inner cover turned in a close posture, in the image forming apparatus according to the embodiment of the present disclosure.
Figure 5:
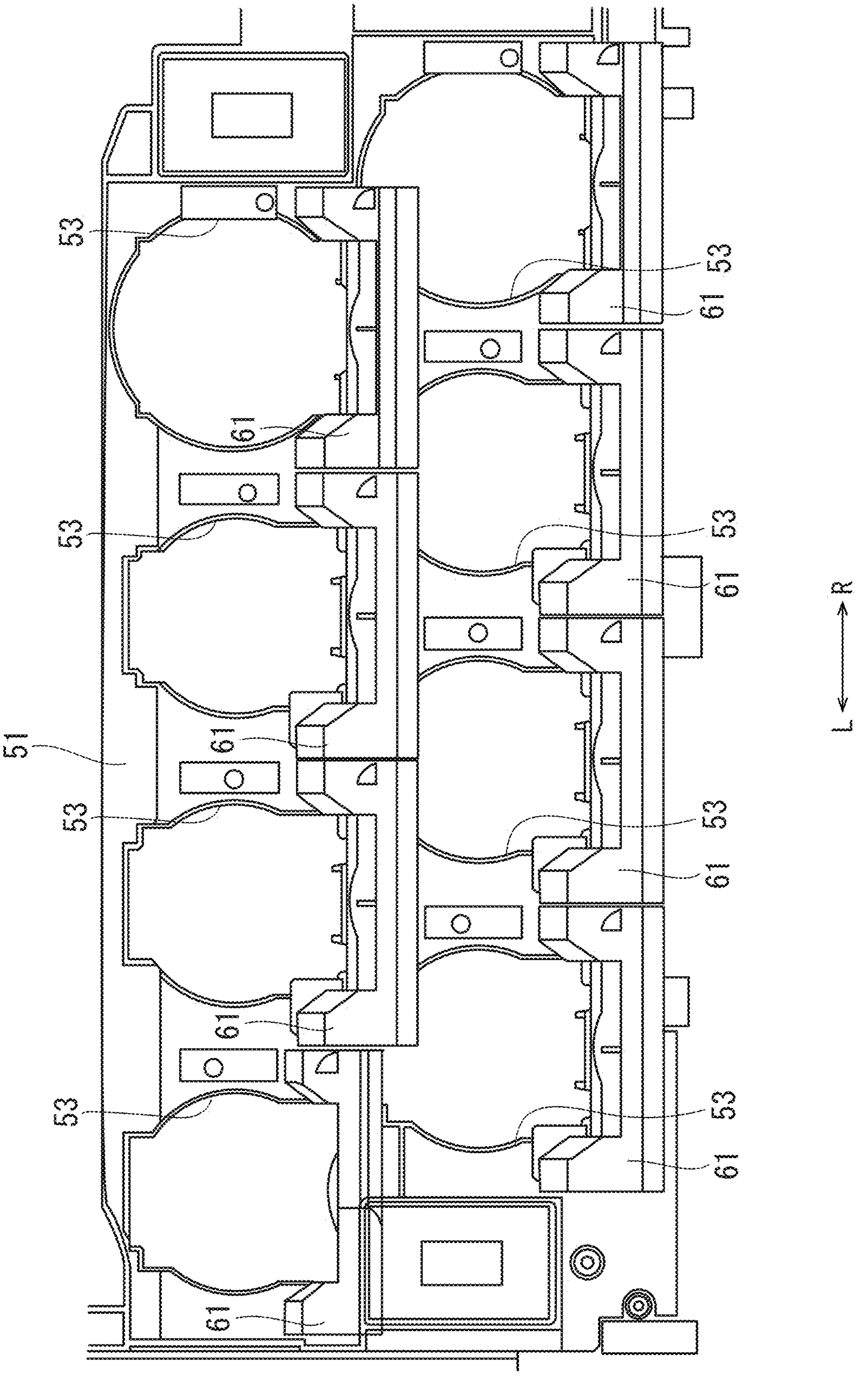
FIG. 5 is a front view showing the inner cover turned in an open posture, in the image forming apparatus according to the embodiment of the present disclosure.
Figure 6:
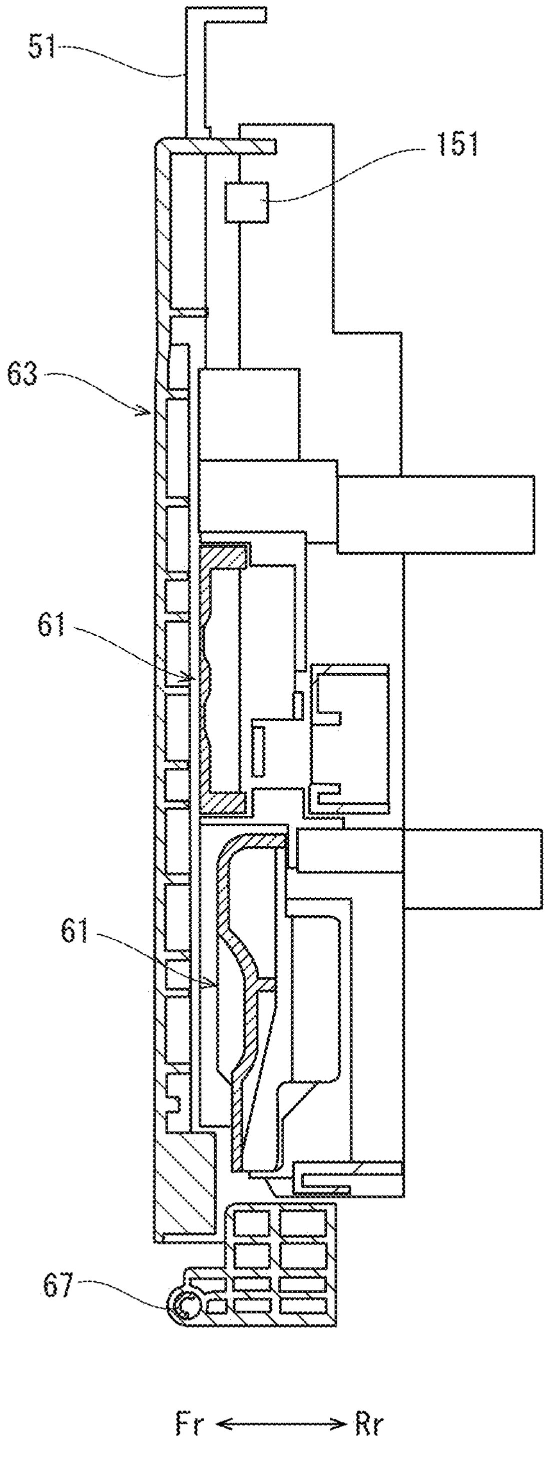
FIG. 6 is a side cross-sectional view showing the inner cover and an outer cover which are turned in a close posture, in the image forming apparatus according to the embodiment of the present disclosure.

Next, the container housing part 41 will be described with reference to FIG. 1 and FIG. 3 to FIG. 6. FIG. 3 is a front view showing the front side plate 51 of the apparatus main body 3, FIG. 4 is a front view showing inner covers 61 turned in a close posture, FIG. 5 is a front view showing the inner covers 61 turned in an open posture, and FIG. 6 is a side view showing the inner cover 61 and the outer cover 63 turned in a close posture.

As shown in FIG. 1, the container housing part 41 houses an upper container group 39A and a lower container group 39B each consisting of four toner containers 39 containing the toner 4 four colors (yellow, cyan, magenta, and black). That is, two toner containers 39 are provided for each color. Thus, as described above, even when one toner container 39 becomes empty, the toner can be supplied from the other toner container 39, so that the stop time of the image forming apparatus 1 associated with the replacement of the toner container can be shortened.

The container housing part 41 is formed between a front side plate 51 and a rear side plate (not shown) of the apparatus main body 3. As shown in FIG. 3, the front side plate 51 has upper and lower opening rows 53A and 53B corresponding to the upper and lower container groups 39A and 39B. Each of the opening rows includes four openings 53 arranged in a horizontal direction (the left-and-right direction). The respective openings 53 of the upper opening row 53A and the respective openings 53 of the lower opening row 53B are displaced in the left-and-right direction by a distance between the adjacent openings 53 in the left-and-right direction. The toner container 39 is attached to and detached from the container housing part 41 through the opening 53.

In each opening row, the four openings 53 correspond to the toner containers 39 of yellow, magenta, cyan, and black in order from the left. The openings 53 corresponding to yellow, magenta and cyan have substantially the same size and shape, and the opening 53 corresponding to black is larger than these openings 53.

The container housing part 41 is provided with a toner replenishing mechanism (not shown) which replenishes the toner from the toner container 39 to the corresponding developing device 35 for each opening 53. The toner replenishing mechanism includes a rotating mechanism for rotating the toner container 39, a pipe arranged between the toner container 39 and the corresponding developing device 35 along the upper-an-lower direction, and a toner sensor 55 (see FIG. 1) for detecting that the toner container 39 becomes empty. The pipe is made of transparent material. As described above, since the openings 53 of each opening row are displaced in the left-and-right direction, the pipe corresponding to the upper opening 53 can be disposed between the pipes of the toner supply mechanisms corresponding to the adjacent openings 53 of the lower opening row.

The toner sensor 55 is a permeability sensor, and detects the presence or absence of the toner in the pipe. The toner sensor 55 is electrically connected to a control part (not shown). A detection result of the toner sensor 55 is transmitted to the control part.

The front side plate 51 rotatably supports an inner cover 61 (see FIG. 4 and FIG. 5) which opens and closes each opening 53, and an outer cover 63 (see FIG. 6) which covers the outside of all the inner covers 61.

As shown in FIG. 3, right and left inner rotational shafts 65 for rotatably supporting the inner cover 61 are provided on both left and right sides of the lower end portion of each opening 53. The inner cover 61 is rotatable around the right and left inner rotational shafts 65 in a close posture for closing the opening 53 (see FIG. 4) and an open posture for opening the opening 53 (see FIG. 5). Further, as shown in FIG. 3, left and right outer rotational shafts 67 for rotatably supporting the outer cover 63 are provided at the right and left lower corners of the front side plate 51. The outer cover 63 is rotatable around the right and left outer rotational shafts 67 in a close posture (see FIG. 6) for covering the outside of all the inner covers 61 and an open posture for exposing all the inner covers 61.

Figure 7:
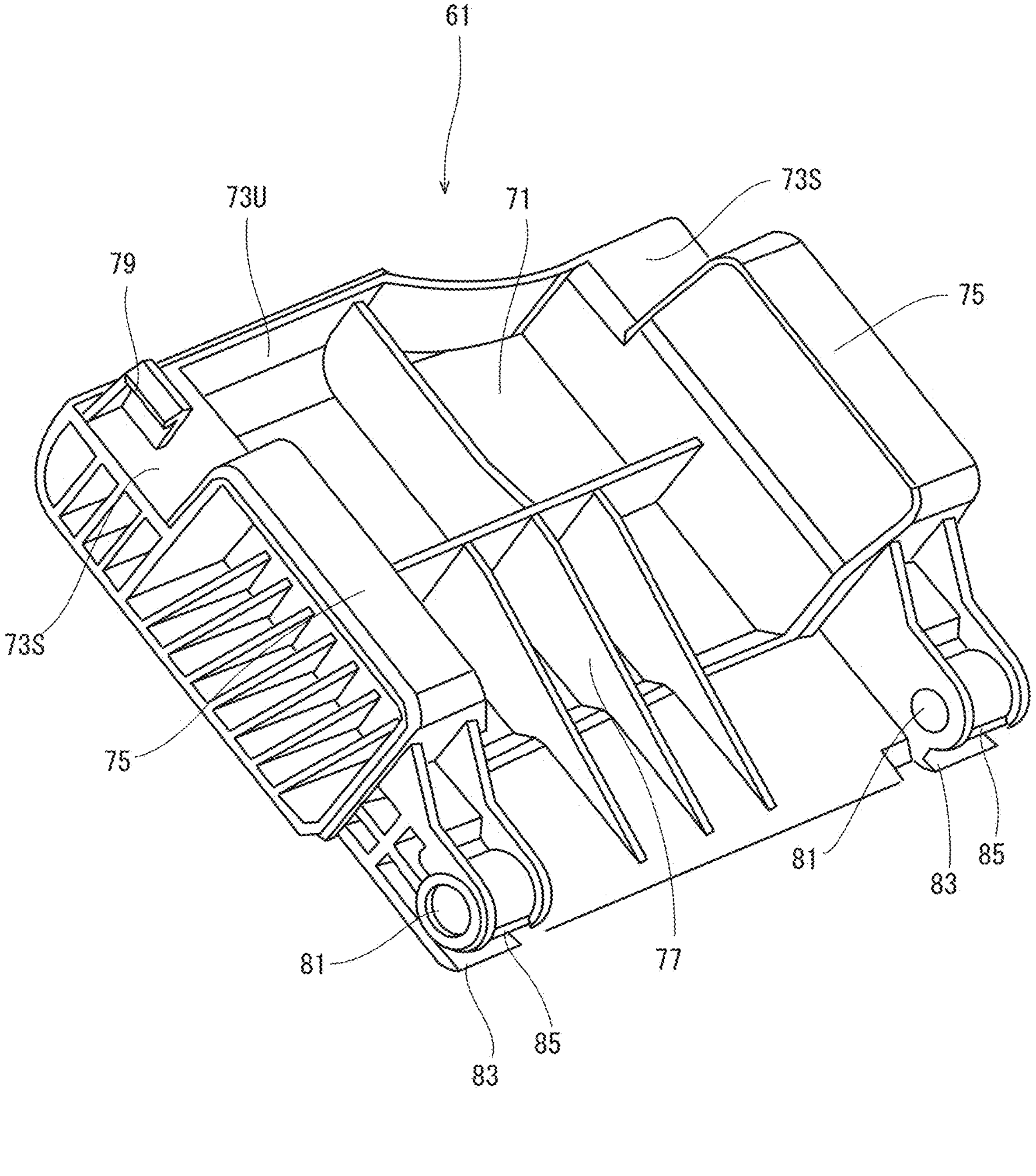
FIG. 7 is a perspective view showing the inner cover in the image forming apparatus according to the embodiment of the present disclosure.

Next, the inner cover 61 will be described with reference to FIG. 7 and FIG. 8. FIG. 7 is a perspective view showing the inner cover 61, and FIG. 8 is a side view showing the inner cover 61.

All the inner covers 61 have the same size (a length in the upper-and-lower direction, and a length in the left-and-right direction) and structure (see FIG. 4). However, depending on the position of the inner cover 61, cutouts or recesses may be provided in order to avoid interference with other components. For example, a notch is formed in the upper left corner of the inner cover 61 for opening and closing the yellow toner container opening 53 in the upper row, and a recess is formed in the inner cover 61 for opening and closing the black toner container opening 53 in the lower row.

Figure 8:
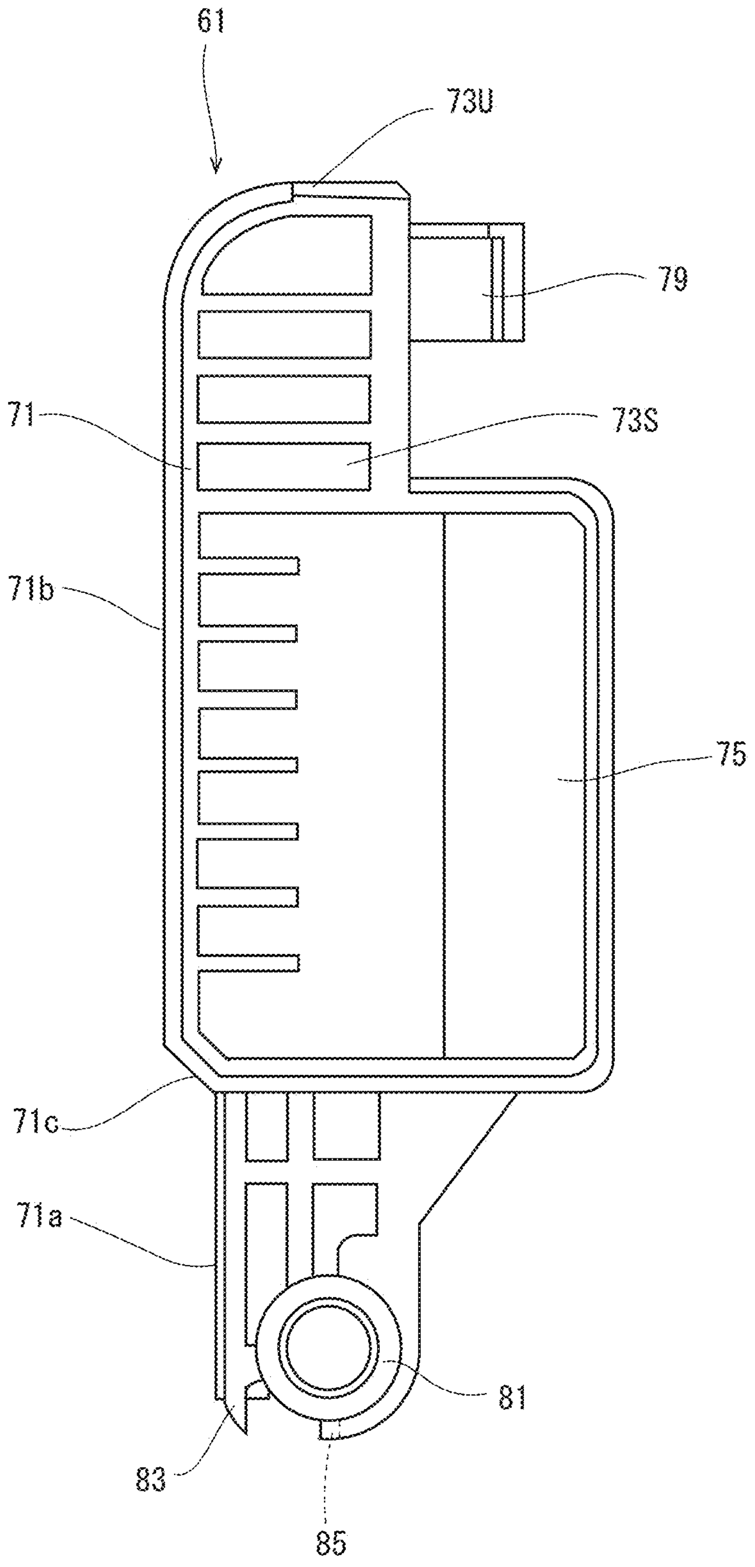
FIG. 8 is a side view showing the inner cover in the image forming apparatus according to the embodiment of the present disclosure.

As shown in FIG. 7 and FIG. 8, the inner cover 61 has a rectangular cover plate 71 having a predetermined height (a length in the upper-and-lower direction) and width (a length in the left-and-right direction). A mark indicating the color of the corresponding toner is marked on the outer surface of the cover plate 71. As shown in FIG. 8, the cover plate 71 is formed so that a lower portion **71*a* is recessed with respect to an upper portion 71*b* through an inclined portion 71*c*** in the thickness direction (the front-and-rear direction).

As shown in FIG. 7, on the inner surface of the cover plate 71, an upper wall 73U is protruded in the thickness direction along the upper edge, and left and right walls 73S are protruded in the thickness direction along the left and right side edges. The right and left walls 73S have a predetermined width in the left-and-right direction. In the center portions of the left and right walls 73S, protruding portions 75 protruding further in the thickness direction are formed. As shown in FIG. 8, the upper outer corners of the cover plate 71 and the upper and lower outer corners of the protruding portion 75 are rounded into the R surface.

As shown in FIG. 7, on the inner surface of the cover plate 71, a plurality of ribs 77 along the upper-and-lower direction and in the left-and-right direction are provided in the space between the upper wall 73U and the left and right walls 73S. Further, at one upper end portion of the left and right walls 73S, a hook 79 is provided which is engaged with the front side plate 51 by a locking device 93 (described later with reference to FIG. 11).

At the lower end portions of the left and right walls 73S, cylindrical right and left bearing portions 81 fitted to the right and left inner rotational shafts 65 of the front side plate 51 are provided. A first protrusion 83 and a second protrusion 85 are formed on the outer circumferential surface of each bearing portion 81. The first protrusion 83 and the second protrusion 85 are spaced apart in the circumferential direction. In this example, the first protrusion 83 and the second protrusion 85 are arranged at a center angle of approximately 90° with respect to the center of the bearing portion 81. The first protrusion 83 and the second protrusion 85 have a predetermined width along the left-and-right direction. The first protrusion 83 has a tapered claw shape extending in a direction parallel to the tangential direction of the bearing portion 81 along an extension of the outer surface of the lower portion **71*a* of the cover plate 71. The second protrusion 85 is disposed inside the first protrusion 83, and protrudes in the radial direction of the bearing portion 81. A height of the second protrusion 85 (a length along the radial direction from the outer surface of the bearing portion 81) is lower than a height of the first protrusion 83**.

With the above configuration, the center of gravity of the inner cover 61 in the close posture is positioned on the outer side (on the front side) of the front side plate 51 than the right and left inner rotational shafts 65. Thus, the inner cover 61 can be automatically turned to the open posture.

Further, the front side plate 51 is provided with a stopper member 91 which holds the inner cover 61 turned in the open posture at at least two opening angles with respect to the front side plate 51, and a locking device 93 which locks the inner cover 61 turned in the close position to the front side plate 51.

Figure 9:
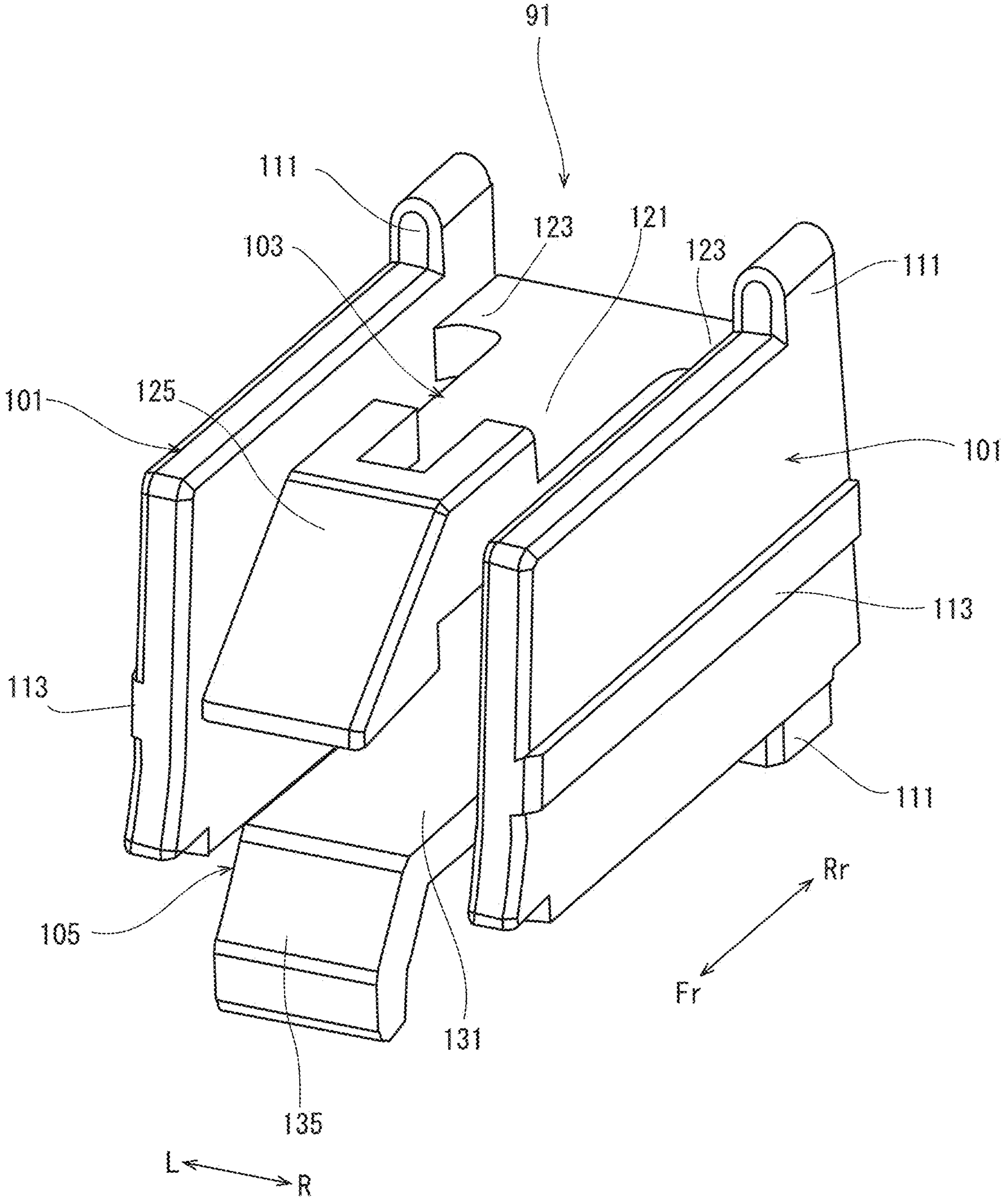
FIG. 9 is a perspective view showing a stopper member in the image forming apparatus according to the embodiment of the present disclosure.
Figure 10:
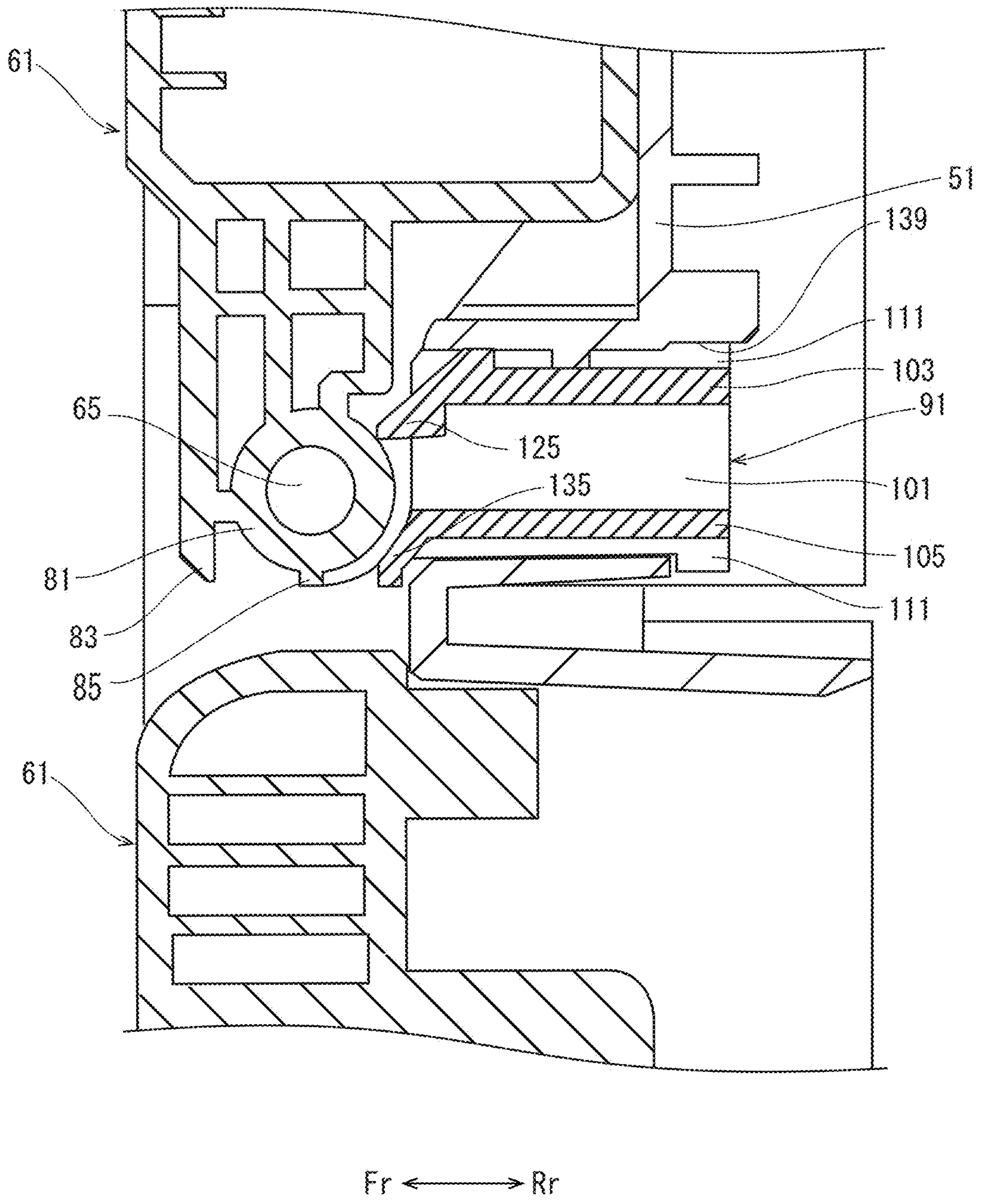
FIG. 10 is a cross-sectional view showing the stopper member supported by a front side plate, in the image forming apparatus according to the embodiment of the present disclosure.

First, the stopper member 91 will be described with reference to FIG. 9 and FIG. 10. FIG. 9 is a perspective view showing the stopper member 91, and FIG. 10 is a side view showing the stopper member 91 supported by the front side plate 51. The stopper member 91 holds the inner cover 61 at an opening angle of 90° with respect to the front side plate 51 and at an opening angle of 120° larger than 90°. The stopper member 91 has right and left side plates 101 facing each other in the left-and-right direction, and upper and lower stopper pieces 103 and 105 cantilevered by the right and left side plates 101. The stopper member 91 is made of, for example, resin.

The right and left side plates 101 have a rectangular shape when viewed from the left-and-right direction. Upper and lower protrusions 111 are formed on the rear end portion of the upper end surface and on the rear end portion of the lower end surface of each side plate 101. On the outer surface of each side plate 101, an outer protrusion 113 is formed along the horizontal direction.

The upper stopper piece 103 has a body portion 121, right and left fixing portion 123, and an engagement portion 125. The body portion 121 is a rectangular plate piece having a predetermined width along the left-and-right direction, a predetermined length along the front-and-rear direction, and a predetermined thickness. The right and left fixing portions 123 protrude in opposite directions from the rear end portions of the right and left side surfaces of the body portion 121. The right and left fixing portions 123 are fixed to the rear end portions of the inner surfaces of the right and left side plates 101.

The engagement portion 125 is provided at the front end portion of the main body portion 121. The engagement portion 125 is thicker than the body portion 121, and is formed in a trapezoidal shape when viewed from the left-and-right direction. The engagement portion 125 has flat upper and lower surfaces, a front end surface inclined downward, and a rear end surface along the upper-and-lower direction. The front end of the engagement portion 125 protrudes forward from the left and right side plates 101. The upper surfaces of the engagement portion 125 are formed at the same height as the upper surfaces of the left and right side plates 101.

The lower stopper piece 105 has a body portion 131, right and left fixing portions, and an engagement portion 135. The main body portion 131 is a rectangular plate piece having the same width, length and thickness as the main body portion 121 of the upper stopper piece 103. The right and left fixing portions protrude in opposite directions from the rear end portions of the right and left side surfaces of the main body portion 131. The right and left fixing portions are fixed to the rear end portions of the inner surfaces of the right and left side plates 101 below the upper stopper piece 103. That is, a space is formed above the lower stopper piece 105. The engagement portion 135 has the same thickness as the main body portion 131, and has an inclined portion bent diagonally downward from the front end portion of the main body portion 131 and a bent portion bent downward from the front end portion of the inclined portion. The engagement portion 135 protrudes forward and downward from the right and left side plates 101.

As shown in FIG. 10, the stopper member 91 is supported by a housing space 139 formed in the front side plate 51 of the apparatus main body 3. The housing space 139 is a substantially rectangular parallelepiped space formed on the rear side of the left and right inner rotational shafts 65, and surrounded by left and right wall surfaces and upper and lower wall surfaces. The stopper member 91 is inserted into the housing space 139 from the rear side of the front side plate 51, and the upper and lower protrusions 111 of the right and left side plates 101 are brought into contact with the front side plate 51, whereby the stopper member 91 is supported by the housing space 139. The outer protrusions 113 of the right and left side plates 101 are brought into contact with the right and left wall surfaces of the housing space 139.

The front end portion of the engagement portion 125 of the upper stopper piece 103 protrudes forward from the housing space 139. The engagement portion 135 of the lower stopper piece 105 protrudes forward and downward from the housing space 139. The protruded front end portion of the engagement portion 125 of the upper stopper piece 103 and the protruded engagement portion 135 of the lower stopper piece 105 are spaced apart in the circumferential direction of the bearing portion 81 around the bearing portion 81 of the inner cover 61 fitted to the inner rotational shafts 65. A predetermined interval is formed between the engagement portion 135 of the lower stopper piece 105 and the bearing portion 81. The front end portion of the engagement portion 125 of the upper stopper piece 103 is substantially in contact with the bearing portion 81.

The upper surface of the engagement portion 125 of the upper stopper piece 103 is in contact with the upper surface of the housing space 139. Thus, an upward turning of the upper stopper piece 103 is restricted. On the other hand, since a space is formed above the lower stopper piece 105, the lower stopper piece 105 can be elastically turned upward around the right and left fixing portions.

Figure 11:
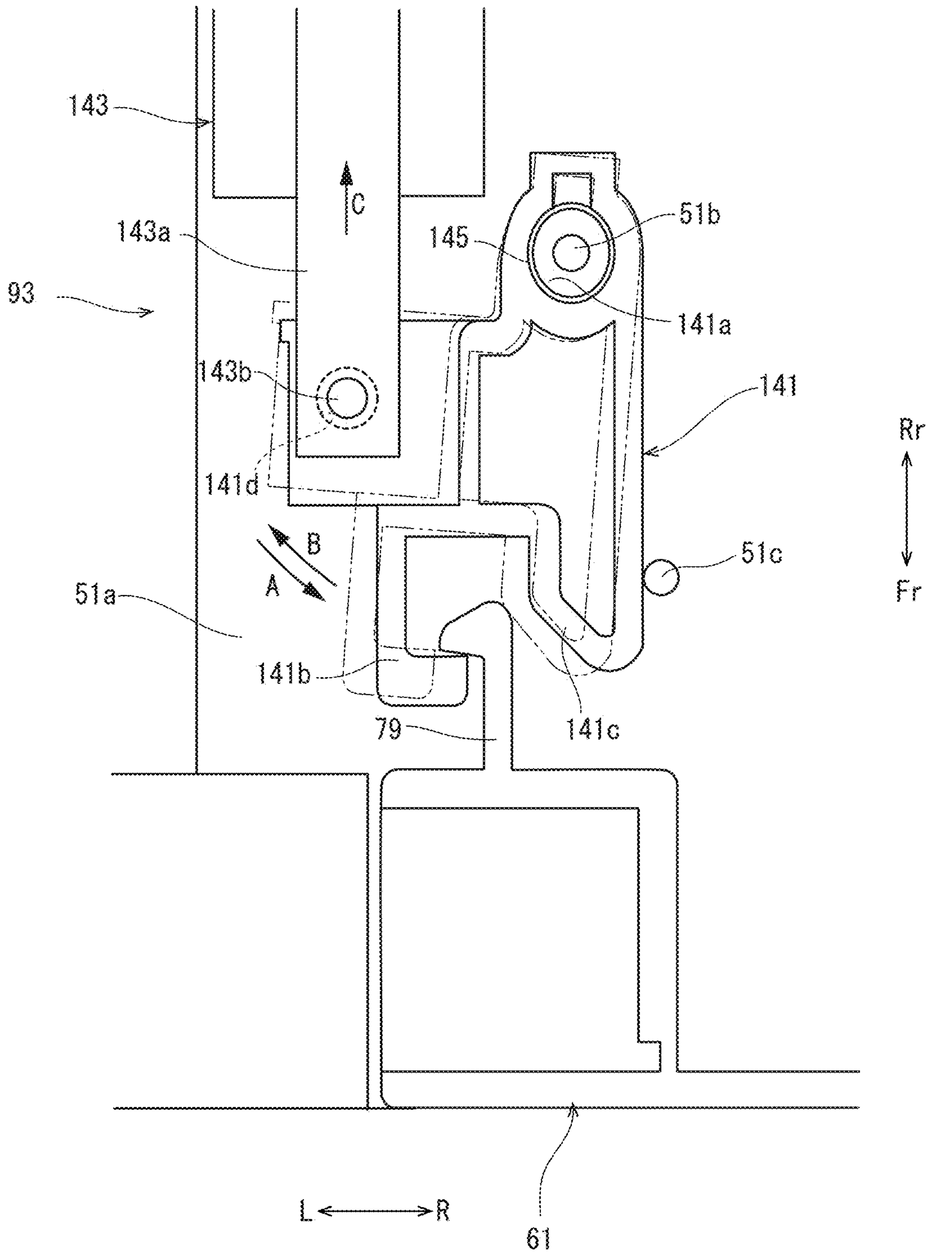
FIG. 11 is a plan view showing a locking device in the image forming apparatus according to the embodiment of the present disclosure.

Next, the locking device 93 will be described with reference to FIG. 11. FIG. 11 is a plan view showing the locking device 93. The locking device 93 is provided on the front side plate 51, and is engaged with the hook 79 provided on the inner cover 61 to lock the inner cover 61 turned in the close posture to the front side plate 51. The locking device 93 is supported by a horizontal fixing plate 51*a* provided on the front side plate 51 corresponding to each opening 53. The locking device 93 includes a hook member 141 capable of being engaged with the hook 79 of the inner cover 61 by turning, and a solenoid 143 for turning the hook member 141.

The hook member 141 has a base end portion provided with a shaft hole 141*a*, and a distal end portion provided with a hook piece 141*b* and a pressing piece 141*c*. A rotational shaft 51*b* provided in the fixing plate 51*a* is inserted into the shaft hole 141*a*. As a result, the hook member 141 is turned on the fixing plate 51*a* around the rotational shaft 51*b*. The hook piece 141*b* and the pressing piece 141*c* are arranged at a predetermined interval along the rotational locus around the shaft hole 141*a*. The hook member 141 is biased by a torsion coil spring 145 disposed in the shaft hole 141*a* so that the hook piece 141*b* is turned in an engagement direction A in which the hook piece 141*b* is engaged with the hook 79 of the inner cover 61. The turning the hook piece 141*b* in the engagement direction A is restricted by a pin 51*c* provided on the fixing plate 51*a*.

When the hook member 141 is biased by the torsion coil spring 145 and turned in the engagement direction A, the hook piece 141*b* can be engaged with the hook 79 of the inner cover 61. On the other hand, when the hook member 141 is turned in a release direction B, which is opposite to the engagement direction A (see the two-dot chain line in FIG. 11), the engagement between the hook piece 141*b* and the hook 79 is released, and the hook 79 is pressed by the pressing piece 141*c* so that the inner cover 61 is turned in the open posture.

The solenoid 143 has a movable member 143*a* movable forward and rearward along the front-and-rear direction. The distal end of the movable member 143*a* is rotatably connected to the hook member 141. Specifically, the distal end of the movable member 143*a* has a shaft 143*b*, and the hook member 141 has an opening 141*d* into which the shaft 143*b* is inserted. A diameter of the opening 141*d* is larger than a diameter of the shaft 143*b*. As the movable member 143*a* moves forward and rearward, the hook member 141 is turned around the rotational shaft 51*b* via the shaft 143*b* and the opening 141*d*. Specifically, when the movable member 143*a* is moved forward, the hook member 141 is turned in the engagement direction A, when the movable member 143*a* is moved rearward, the hook member 141 is turned in the release direction B.

The solenoid 143 is electrically connected to the control part. The solenoid 143 is switched between an energized state and a non-energized state by the control part.

Next, the outer cover 63 will be described with reference to FIG. 6. The outer cover 63 has a rectangular shape having substantially the same size as the front side plate 51. On the inner surface of the outer cover 63, a plurality of ribs are provided along the upper-and-lower direction and the left-and-right direction. The outer cover 63 is rotatably supported by the right and left outer rotational shafts 67 provided on the front side plate 51. The outer cover 63 is turned in a close posture for covering the front side plate 51 and an open posture for opening the front side plate 51.

A locking device (not shown) locks the outer cover turned in the open posture to the front side plate 51. An opening angle of the outer cover 63 with respect to the front side plate 51 turned in the open posture is approximately 90°. The front side plate 51 is provided with an opening/closing detection switch 151 for detecting the opening/closing of the outer cover 63. The opening/closing detection switch 151 is switched from ON to OFF when the outer cover 63 is slightly opened from the position of FIG. 6 (the close posture). The opening/closing detection switch 151 is electrically connected to the control part.

Figure 12:
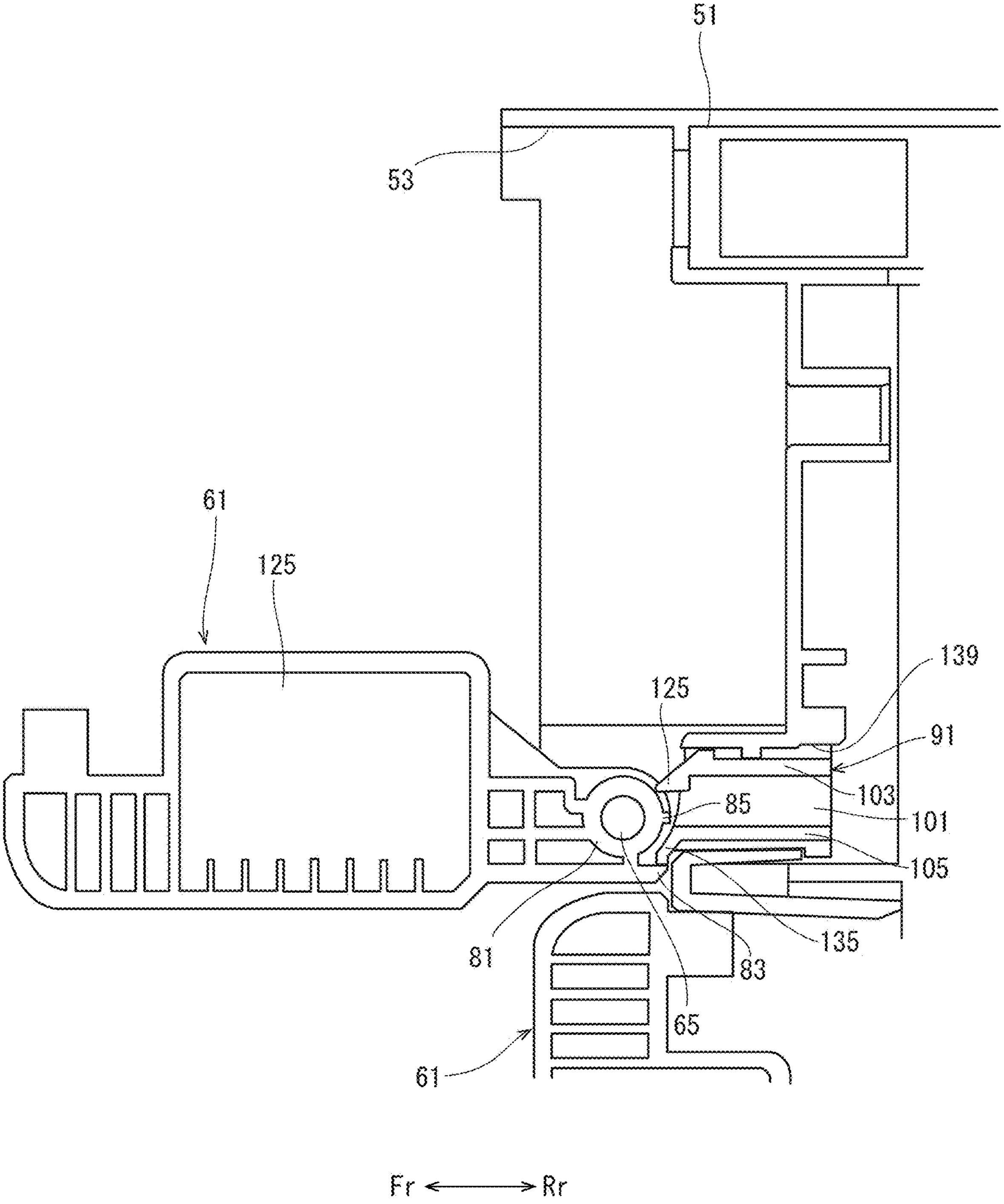
FIG. 12 is a side view showing the inner cover turned in an open posture (an opening angle is 90°) in the image forming apparatus according to the embodiment of the present disclosure.
Figure 13:
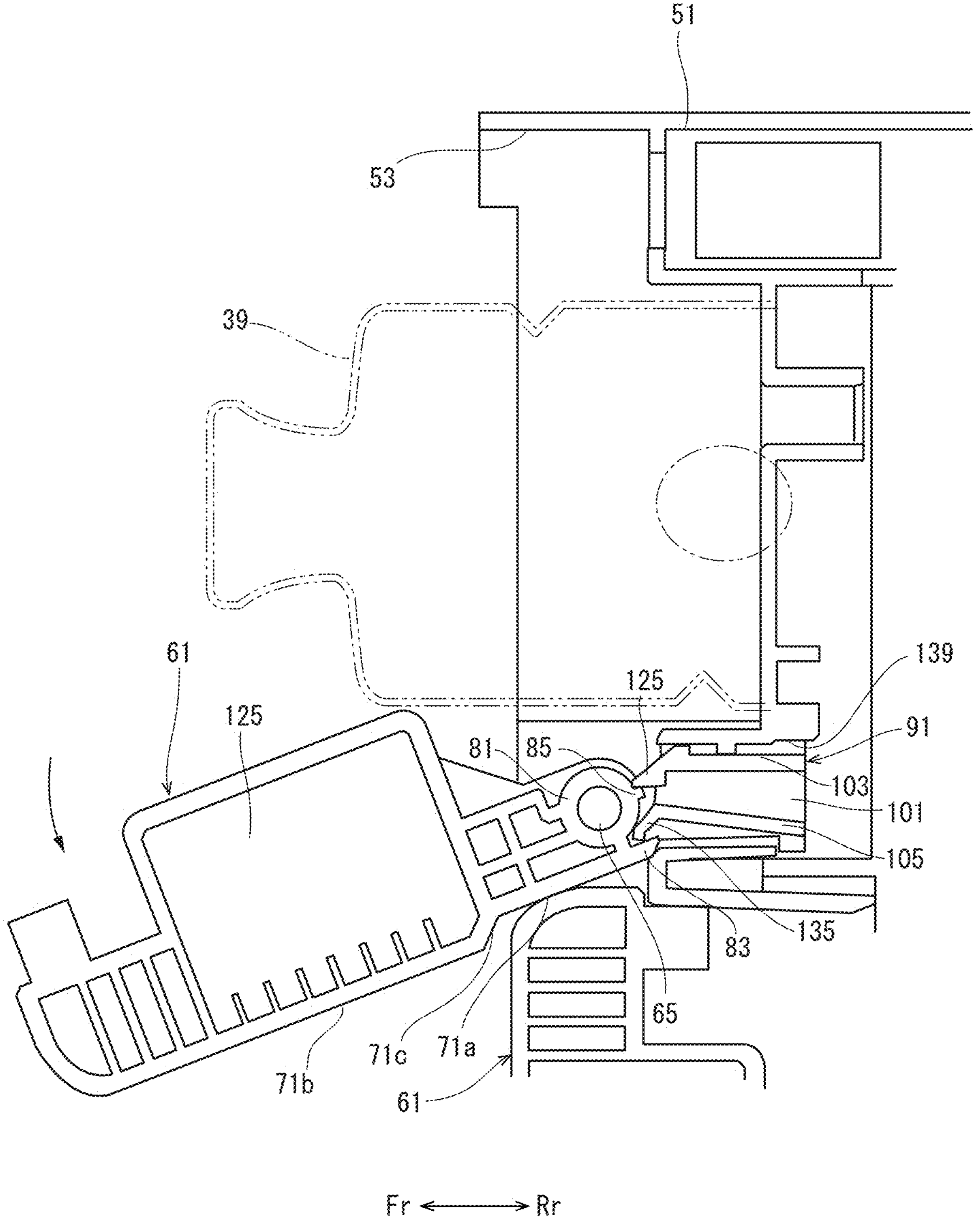
FIG. 13 is a side view showing the inner cover turned in an open posture (an opening angle is 120°) in the image forming apparatus according to the embodiment of the present disclosure.

The opening and closing operation of the inner cover 61 in the image forming apparatus 1 having the above configuration will be described with reference to FIG. 12 and FIG. 13. FIG. 12 is a side view showing the inner cover 61 turned in the open posture (an opening angle is 90°), and FIG. 13 is a side view showing the inner cover 61 turned in the open posture (an opening angle is 120°).

During the image forming operation, the outer cover 63 and the inner cover 61 are turned to the close posture, and locked to the close posture by the respective locking devices. When the inner cover 61 is turned in the close posture, the upper wall 73U, the right and left walls 73S and the protruding portions 75 abut against the front side plate 51 on both sides of the opening 53, and the opening 53 is closed by the cover plate 71. Further, as shown in FIG. 4, when all the inner covers 61 are turned in the close posture, there is almost no gap between the adjacent inner covers 61 in the left-and-right direction, and a gap between the inner covers 61 in the upper-and-lower direction is narrowed as much as possible.

When the control part determines that the predetermined toner container 39 becomes empty based on the detection result of the toner sensor 55, a message indicating that the toner container 39 needs to be replaced is displayed on a display part (not shown) or the like. After confirming the message, the user turns the outer cover 63 to the open posture. Then, the opening/closing detection switch 151 is switched from ON to OFF, and the control part switches the solenoid 143 of the locking device 93 provided in the corresponding opening 53 from the non-energized state to the energized state only for a predetermined period of time.

As a result, the movable member 143*a* is moved rearward (see the arrow C in FIG. 11), and the hook member 141 is turned in the release direction B to separate from the hook 79 of the inner cover 61. Further, the pressing piece 141*c* of the hook member 141 presses the hook 79. As described above, in the close posture of the inner cover 61, the center of gravity of the inner cover 61 is positioned on the outer side of the front side plate 51 than the right and left inner rotational shafts 65. In addition to the above configuration, the pressing piece 141*c* of the hook member 141 pushes the hook 79, so that when the toner container 39 becomes empty, the corresponding inner cover 61 is automatically and surely turned to the open posture.

Therefore, when the outer cover 63 is opened, the inner cover 61 is automatically turned in the open posture while leaning on the outer cover 63.

As shown in FIG. 12, the inner cover 61 is turned until the first protrusion 83 formed in the bearing portion 81 is engaged with the engagement portion 135 of the lower stopper piece 105 of the stopper member 91. At this time, an opening angle of the inner cover 61 with respect to the front side plate 51 is 90° in this example. As described above, the lower stopper piece 105 is an example of the first stopper which holds the inner cover 61 at an opening angle of 90° or less in the present disclosure. Since a height of the second protrusion 85 is lower than a height of the first protrusion 83, the second protrusion 85 passes between the lower stopper piece 105 and the bearing portion 81 during the turning of the inner cover 61.

When the inner cover 61 is turned in the open posture in the above manner, the opening 53 of the front side plate 51 is exposed. However, in this state, the protruding portions 75 of the inner cover 61 exist in front of the opening 53, that is, in front of the toner container 39.

The user then pulls out the toner container 39 forward through the opening 53, as shown in FIG. 13. At this time, the toner container 39 comes into contact with the protruding portions 75 of the inner cover 61. Then, the protruding portions 75 are pushed by the toner container 39, and the inner cover 61 is turned further downward. At this time, since the first protrusion 83 of the inner cover 61 pushes up the lower stopper piece 105, the lower stopper piece 105 is elastically turned upward.

The inner cover 61 is turned until the second protrusion 85 abuts the engagement portion 125 of the upper stopper piece 103 (see the arrow in FIG. 13). At this time, an opening angle of the inner cover 61 is 120°. By turning the inner cover 61 in this manner, the toner container 39 can be pulled out through the opening 53. The upper stopper piece 103 is an example of the second stopper which holds the inner cover 61 at an angle of larger than 90°.

In addition, when the inner cover 61 is turned in this manner, the upper corner portion of the lower inner cover 61 enters the corner between the lower portion 71*a* and the inclined portion 71*c* of the cover plate 71 of the inner cover 61. As described above, the lower portion 71*a* of the cover plate 71 is an example of the recess in which the upper end portion of the lower inner cover 61 enters when the inner cover 61 is turned in the open posture. Thus, even when the upper inner cover 61 and the lower inner cover 61 are close to each other in the upper-and-lower direction so that the rotation range of the upper inner cover 61 and the rotation range of the lower inner cover 61 partially overlap, the upper inner cover 61 can be turned at an opening angle of 120°.

When the toner container 39 is completely pulled out, the lower stopper piece 105 elastically returns to bias the inner cover 61 upward. As a result, the inner cover 61 returns to the open posture (see FIG. 12) in which the opening angle is 90°.

The user detaches the empty toner container 39 and attaches a new toner container 39 to the container housing part 41 through the opening 53. Each toner container 39 is attached to the container housing part 41 in an attachment direction along the front-and-rear direction, with the end portion provided with the discharge port 39*b* facing forward (the rear side). Then, the attachment of the container is detected, and the various information is read from the memory chip and then transmitted to the control part (not shown). The control part stores the detection result of the toner sensor 55 and the various information read from the toner container 39 in correspondence with each other.

After the toner container 39 is attached, the inner cover 61 is turned upward. Then, the hook 79 of the inner cover 61 presses the hook piece 141*b* of the hook member 141 of the locking device 93. As described above, since there is a play between the shaft 143*b* provided at the distal end of the movable member 143*a* and the opening 141*d* provided in the hook member 141, the hook member 141 is turned in the release direction B, and after the inner cover 61 is turned in the close posture completely, the hook member 141 is turned in the engagement direction A by being biased by the torsion coil spring 145, and the hook piece 141*b* is engaged with the hook 79 of the inner cover 61. That is, the inner cover 61 is locked to the front side plate 51 by the locking device 93.

When the inner cover 61 is turned in the close posture as described above, the toner container 39 is pushed in by the inner cover 61. Thus, the toner container 39 can be surely attached to the container housing part 41. When the toner container 39 is rotated at the time of supplying the toner from the toner container 39 to the developing device 35, the toner container 39 may move in the front-and-rear direction. In this case, the movement of the toner container 39 in the forward direction is restricted by the inner cover 61.

Thereafter, the user turns the outer cover 63 to the close posture. Then, the control part drives the rotation mechanism of the toner supply mechanism in response to the detection of the attachment of the toner container 39 and the turning of the outer cover 63 in the close posture. As a result, the toner container 39 rotates, and the contained toner is conveyed toward the discharge port 39*b* by the spiral protrusion 39*c*. The toner is discharged from the discharge port 39*b* to the pipe, and supplied to the corresponding developing device 35 through the pipe.

When the toner sensor 55 detects that the toner is supplied, the rotation drive of the toner container 39 is stopped. When the toner is not detected by the toner sensor 55 within a predetermined time, it is determined that the toner container is empty and the rotation drive of the toner container 39 is stopped. Therefore, when the outer cover 63 is opened, the solenoid 143 is energized again, and the inner cover 61 is opened.

When the toner container 39 is replaced, one empty toner container 39 may be replaced, and the two toner containers 39 may be replaced simultaneously after the two toner containers 39 become empty. When one toner container 39 is replaced, it is replaced as described above.

When the two toner containers 39 are replaced simultaneously, when the user turns the outer cover 63 in the open posture, the upper and lower inner covers 61 are automatically turned in the open posture simultaneously. At this time, both the upper and lower inner covers 61 are turned at the opening angle of 90°. When the toner container 39 is pulled out, as described above, the inner cover 61 is pushed by the toner container 39 and turned further downward, so that the toner container 39 can be pulled out. When the upper toner container 39 is pulled out, as described above, the inner cover 61 is turned to the opening angle of 120°, but after pulling out, the lower stopper piece 105 elastically returns and the inner cover 61 is turned to the opening angle of 90°. Therefore, when the lower toner container 39 is pulled out, the inner cover 61 does not exist in the space in front of the toner container 39. Accordingly, the lower toner container 39 can be pulled out without interfering with the upper inner cover 61 turned in the open posture.

When the toner container 39 is pulled out, the R-surface shaped upper corner of the inner cover 61 slides with respect to the toner container 39, so that the toner container 39 is smoothly detached without being caught on the inner cover 61.

As is clear from the above description, according to the image forming apparatus 1 of the present disclosure, even when the inner covers 61 are arranged in the upper-and-lower direction and the left-and-right direction almost without any gap, and the rotation range of the upper inner cover 61 and the rotation range of the lower inner cover 61 overlap, the upper and lower toner containers 39 can be smoothly attached and detached without interfering with the inner cover 61 turned in the open posture.

Specifically, when the lock of the inner cover 61 by the locking device 93 is released, the inner cover 61 is automatically turned and held at the opening angle of 90°. When the toner container 39 is pulled out and the inner cover 61 is pushed down, the inner cover 61 is turned to the opening angle of 120°, but after the toner container 39 is pulled out, the inner cover 61 is automatically turned to the opening angle of 90°. Therefore, when the lower toner container 39 below the pulled out upper toner container 39 is pulled out, the toner container 39 is prevented from interfering with the upper inner cover 61.

When the upper inner cover 61 is turned in the open posture, the upper corner of the lower inner cover 61 enters the lower portion 71*a* of the cover plate 71 of the inner cover 61, so that the upper inner cover 61 can also be turned to the opening angle of 90° or larger.

Further, when the toner sensor 55 detects that the toner container 39 becomes empty, when the outer cover 63 is opened, the locking device 93 of the inner cover 61 for opening and closing the opening 53 corresponding to the toner container 39 releases the locking of the inner cover 61. In a state where the inner cover 61 is turned in the close posture, the center of gravity of the inner cover 61 is positioned on the outer side of the front side plate 51 than the inner rotational shafts 65. Accordingly, when the locking of the inner cover 61 by the locking device 93 is released, the inner cover 61 is automatically turned in the open posture, thereby improving the workability of attaching and detaching the toner container 39.

The upper and lower stopper pieces 103 and 105 are cantilevered by the right and left side plates 101, and are integrally formed as the stopper member 91. Therefore, both pieces can be easily positioned and mounted in the housing space 139. Further, since the upward turning of is restricted, after the inner cover 61 is turned until the second protrusion 85 is engaged with the upper stopper piece 103, further turning of the inner cover 61 is restricted. Therefore, excessive turning of the inner cover 61 can be restricted.

The opening angle of the inner cover 61 is not limited to 90° and 120°. One opening angle may be less than 90° and the other opening angle may be larger than 90°. The inner cover 61 may be turned to two or more opening angles.

The container housing part 41 may be provided to house three or more container groups. Further, the openings in the upper and lower opening rows need not be displaced in the left-and-right direction.

While the present disclosure has been described for specific embodiments, the present disclosure is not limited to those embodiments. Without departing from the scope and intent of this disclosure.

The invention claimed is:

1. An image forming apparatus comprising:

a plurality of container groups each including a plurality of toner containers containing of toner of different colors; and a housing part to and from which the toner container is attached and detached, wherein the housing part includes:

a side plate in which opening rows are formed for each container group in a plurality of levels in an upper-and-lower direction, the opening row including a plurality of openings through which the toner containers are attached and detached and which are arranged horizontally;

a cover which is supported by a rotational shaft provided at a lower end portion of each opening of the side plate, and is turned in an open posture for opening the opening and a close posture for closing the opening;

a locking device which locks the cover turned in the close posture to the side plate; and a first stopper which holds the cover at an opening angle of 90° or less to the side plate and a second stopper which holds the cover at an opening angle of larger than 90° when the cover is turned to the open posture.

2. The image forming apparatus according to claim 1, wherein the first stopper and the second stopper are spaced apart in a circumferential direction of the rotational shaft, and the first stopper is elastically deformed to be turned upward.

3. The image forming apparatus according to claim 2, wherein the cover has a first protrusion and a second protrusion spaced apart in the circumferential direction of the rotational shaft, when a locking of the cover by the locking device is released, the cover is turned by its own weight until the first protrusion is engaged with the first stopper, and thereafter, when the cover is pushed downward, the first stopper is pushed by the first protrusion to be elastically deformed to be turned, and the cover is turned until the second protrusion is engaged with the second stopper.

4. The image forming apparatus according to claim 3, wherein the cover is pushed down by the toner container pulled out through the opening.

5. The image forming apparatus according to claim 2, wherein when the cover is released after being pushed down, the cover is turned until stopper is elastically returned and the first protrusion is engaged with the first stopper.

6. The image forming apparatus according to claim 1, wherein the first stopper and the second stopper are integrally formed.

7. The image forming apparatus according to claim 1, wherein the cover has a recess recessed in a thickness direction of the cover, and an upper end portion of the lower cover enters the recess when the upper cover is turned in the open posture.

8. The image forming apparatus according to claim 1, wherein a center of gravity of the cover is positioned on an outer side of the side plate than the rotational shaft when the cover is turned in the close posture.

9. The image forming apparatus according to claim 1, comprising:

a sensor which detects that the toner container becomes empty, wherein when the sensor detects that the toner container becomes empty, a locking of the cover by the locking device corresponding to the cover which opens and closes the opening corresponding to the toner container is released.

* * * * *